United States Patent
Holbrook et al.

[11] Patent Number: 5,858,159
[45] Date of Patent: Jan. 12, 1999

[54] METHOD FOR MANUFACTURING AUTOMOTIVE SEAT ASSEMBLIES USING PRE-BONDED ADHESIVES

[75] Inventors: Annette H. Holbrook, Plymouth; Peter A. Pehur, White Lake, both of Mich.

[73] Assignee: Hoover Universal, Inc., Plymouth, Mich.

[21] Appl. No.: 802,217

[22] Filed: Feb. 19, 1997

Related U.S. Application Data

[63] Continuation of Ser. No. 427,765, Apr. 25, 1995, abandoned.

[51] Int. Cl.⁶ .............................. B32B 31/04; B32B 31/20
[52] U.S. Cl. .................... 156/256; 256/278; 256/510; 297/452.61; 297/452.62; 297/452.38
[58] Field of Search ..................... 156/256, 278, 156/510; 297/452.61, 452.62, 452.38

[56] References Cited

U.S. PATENT DOCUMENTS

| | | | |
|---|---|---|---|
| 3,755,051 | 8/1973 | Stumpf . | |
| 3,877,974 | 4/1975 | Mischutin | 428/290 |
| 3,953,632 | 4/1976 | Robinson | 428/95 |
| 4,083,744 | 4/1978 | Degens | 156/306 |
| 4,277,527 | 7/1981 | Duhl | 428/109 |
| 4,333,786 | 6/1982 | Cibardi et al. | 156/306.6 |
| 4,403,356 | 9/1983 | Urai . | |
| 4,579,388 | 4/1986 | Urai . | |
| 4,692,199 | 9/1987 | Kozlowski | 156/245 |
| 4,708,760 | 11/1987 | Mark et al. | 156/362 |
| 4,715,916 | 12/1987 | Shimada . | |
| 4,737,226 | 4/1988 | Inoue | 156/245 |
| 4,792,371 | 12/1988 | Miyota et al. | 156/131 |
| 4,795,517 | 1/1989 | Elliot | 156/221 |
| 4,925,513 | 5/1990 | Witzke et al. . | |
| 4,975,135 | 12/1990 | Lowe | 156/155 |
| 5,290,093 | 3/1994 | Crayne et al. . | |
| 5,326,417 | 7/1994 | Phelps . | |
| 5,372,668 | 12/1994 | Bracesco | 156/214 |

OTHER PUBLICATIONS

Nordson Corporation Website, Products: Converting Systems, http://www.nordson.com/converti.htm, Feb. 10, 1998.

*Primary Examiner*—Jan Ludlow
*Attorney, Agent, or Firm*—Harness, Dickey & Pierce, P.L.C.

[57] ABSTRACT

A method for manufacturing automotive seat assemblies using fabrics with pre-bonded adhesives. Adhesives are pre-bonded to the back surface of fabric material using a variety of processes. The fabric with pre-bonded adhesive is then cut into pieces, which may be joined with other pieces, to form a trim cover assembly. Heat is then applied to activate the adhesive and attach the trim cover assembly to a cushion pad to manufacture a complete automotive seat assembly. The invention methodology allows the use of shorter bonding cycle times to achieve a suitable bond and reduces the likelihood of omitting, improperly positioning or wrinkling the adhesive.

10 Claims, 4 Drawing Sheets

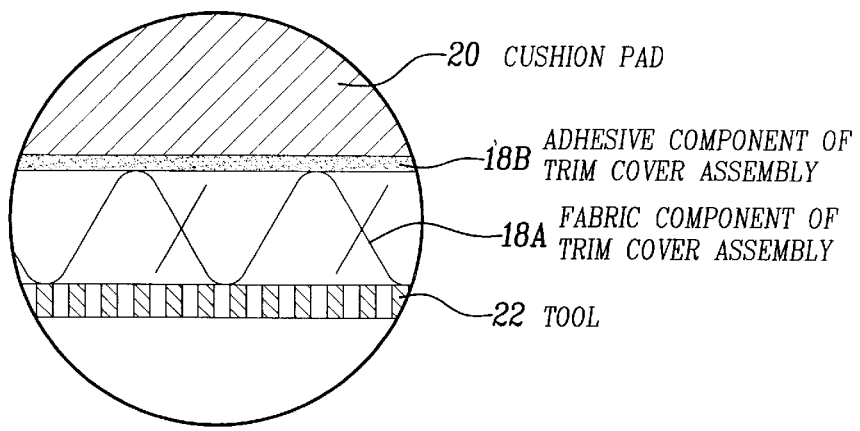
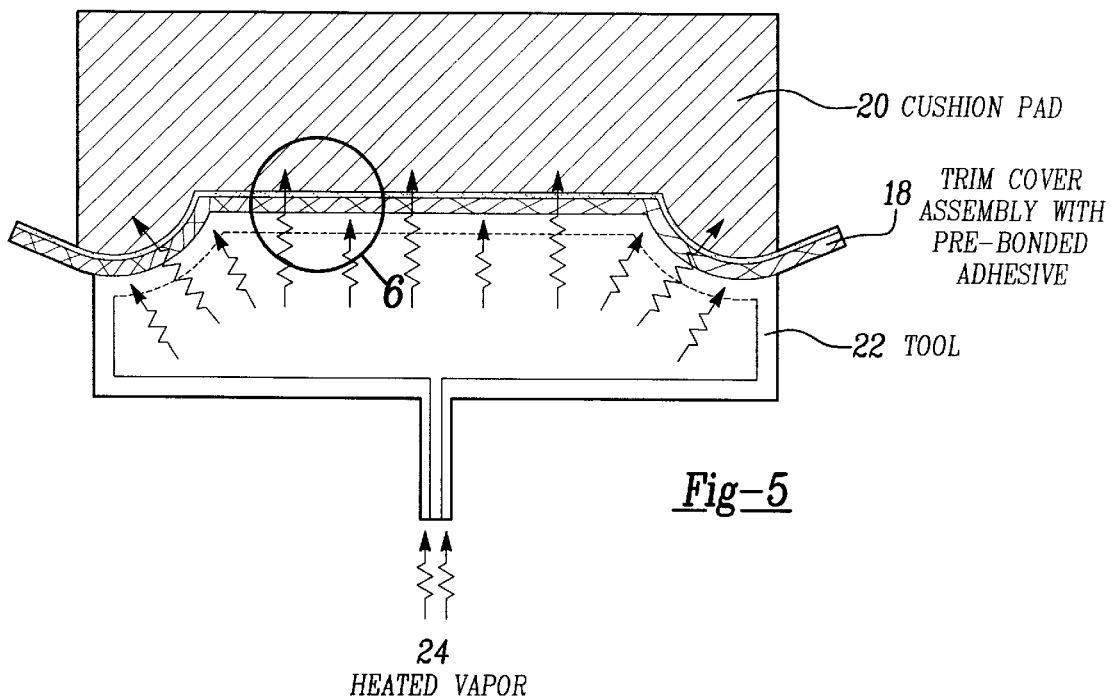
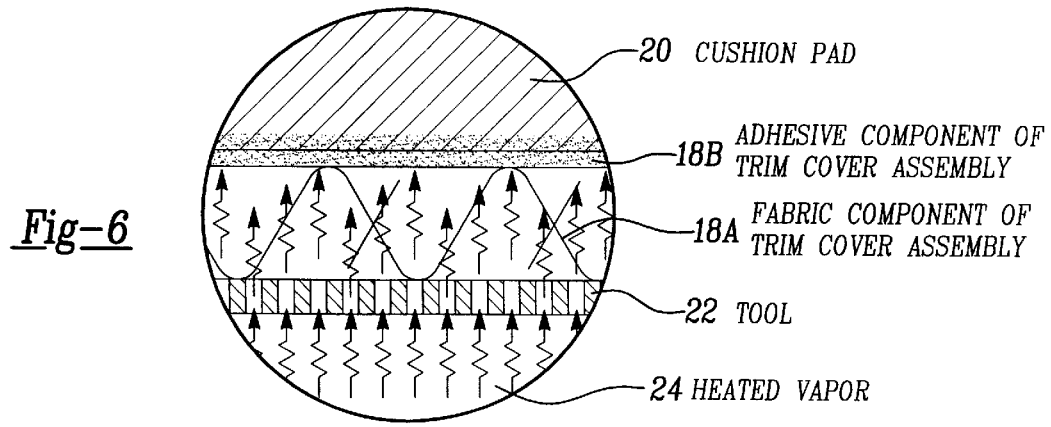

METHOD FOR MANUFACTURING AUTOMOTIVE SEAT ASSEMBLIES USING PRE-BONDED ADHESIVES

This is a continuation division of U.S. patent application Ser. No. 08/427,765, filed Apr. 25, 1995, now abandoned.

BACKGROUND OF THE INVENTION

This invention relates generally to a method for manufacturing automotive seat assemblies, and more particularly to the use of fabrics with pre-bonded adhesives in the manufacture of automotive seat assemblies.

Styling and manufacturing considerations make it desirable to attach trim cover assemblies to cushion pads during the manufacture of automotive seat assemblies. The trim cover assemblies are typically comprised of cloth, leather, vinyl or other textile fabrics, and the cushion pads are typically comprised of polyurethane foam or rubberized hair. Several methods of attaching these components are currently being used.

Solvent-based or chemical adhesives, such as polyurethanes, may be used to attach trim cover assemblies to cushion pads. Use of these adhesives typically results in air emissions of hazardous chemicals, involves complicated material and waste handling procedures, and must be carefully engineered and monitored to reduce the possibility of exposing workers to hazardous materials.

Thermoplastic adhesives offer an environmentally friendly alternative to solvent-based or chemical adhesives. In conventional methods that use thermoplastic adhesives to attach the fabric material to the cushion material, a sheet of adhesive is placed between the components. The temperature of the adhesive is then raised to its softening point, typically through the application of heated vapor, such as steam. The thermoplastic adhesive forms a physical bond with the fabric material and the cushion material by simultaneously intruding into the fabric material and the cushion material.

Using these methods, it is typically more difficult to effectuate a suitable bond at the fabric material interface than it is to effectuate a suitable bond at the cushion material interface. This is particularly true for fabrics which have a conventional backcoat layer applied to the back of the fabric. The conventional backcoat layer consists of a latex or acrylic substance with a rubbery texture which is typically applied to fabric to prevent shrinkage and curling after it has been cut.

In addition, the heat required to effectuate a suitable bond at the fabric material interface is applied through a three-dimensional tool in conventional bonding methods. Because it is almost impossible to maintain a constant temperature across the entire surface of the tool during the bonding process, the tool must be heated beyond the ideal temperature to assure that the coolest section of the tool is at a high enough temperature to obtain a proper bond.

To overcome these problems, conventional attachment methods use large quantities of adhesive and long bonding cycle times to assure that a sufficient quantity of adhesive has migrated into the fabric material to obtain a suitable bond.

Because both the fabric material and the cushion material are heat sensitive, long bonding cycle times result in degradation of the fabric material and the cushion material, such as nap crush and loss of foam loft.

In addition, the improper application of the adhesive layer in conventional methods often results in quality problems in the finished seat. If the layer is improperly positioned or unintentionally omitted, the fabric material will not be properly attached to the cushion material. If wrinkles are introduced in the adhesive layer, they may be visible through the fabric.

In U.S. Pat. No. 4,692,199, a method for bonding an automotive trim cover assembly to a cushion pad is disclosed in which an impervious adhesive film is drawn by a vacuum against an automotive trim cover assembly; this film is placed in contact with the cushion pad and steam is used to diffuse the adhesive film into the fabric material and the cushion material. This method suffers from all of the process limitations and potential for quality defects noted above.

In U.S. Pat. No. 4,737,226, a method for manufacturing an automotive seat is disclosed in which a thermally weldable adhesive cloth is interposed between an automotive trim cover assembly and a cushion pad and then welded by means of heat and pressure to effectuate the bond between the fabric material and the cushion material. This method also exhibits all of the process limitations and potential for quality defects noted above.

In U.S. Pat. No. 4,795,517, an apparatus and process for shaping and covering cushion foam is disclosed in which a hot melt adhesive is placed between an automotive trim cover assembly and a cushion pad and superheated vapor is ejected through the fabric material and adhesive layer into the cushion material. This process also exhibits all of the process limitations and potential for quality defects noted above.

It is therefore desirable to provide an improved method for manufacturing automotive seat assemblies which allows for shorter bonding cycle times to effectuate a suitable bond between the fabric material and the cushion material and which alleviates the potential for quality defects noted above.

SUMMARY OF THE INVENTION

The present invention provides a method for manufacturing automotive seat assemblies in which automotive trim cover assemblies are attached to cushion pads using shorter bonding cycle times and which method reduces the likelihood of omitting, improperly positioning or wrinkling the adhesive.

In this method, a thermoplastic adhesive is pre-bonded to fabric material before the fabric is cut and assembled into trim cover assemblies. Trim cover assemblies containing this fabric with pre-bonded adhesive are then attached to cushion pads to complete the assembly of an automotive seat.

A variety of methods for pre-bonding thermoplastic adhesives to fabric materials may be used. Lamination, porous coating, rotogravure and roll coating techniques have been used to successfully pre-bond adhesive to fabric material. Adhesive or a compound containing adhesive may also be pre-bonded as a replacement for a traditional backcoat layer on the back of the fabric. The fabric with pre-bonded adhesive is then cut into pieces, which may be joined with other pieces, to create a trim cover assembly. The pieces of fabric are typically joined by a sewing operation. Trim cover assemblies with pre-bonded adhesive are then attached to cushion pads using conventional bonding equipment.

The invention consists of certain novel features and processing details hereinafter more fully described, it being understood that various changes in the details may be made without departing from the spirit, or sacrificing any of the advantages of the present invention.

DESCRIPTION OF THE DRAWINGS

The advantages, nature and additional features of the invention will become more apparent from the following description, taken in connection with the accompanying drawings, in which:

FIG. 4 is an enlarged view taken within circle 4 of FIG. 3;

FIG. 5 is a cross-sectional diagram of a trim cover assembly with pre-bonded adhesive in accordance with an embodiment of this invention in a bonding machine during the bonding process;

FIG. 6 is an enlarged view taken within circle 6 of FIG. 5;

DESCRIPTION OF THE PREFERRED EMBODIMENTS

Figure 1:
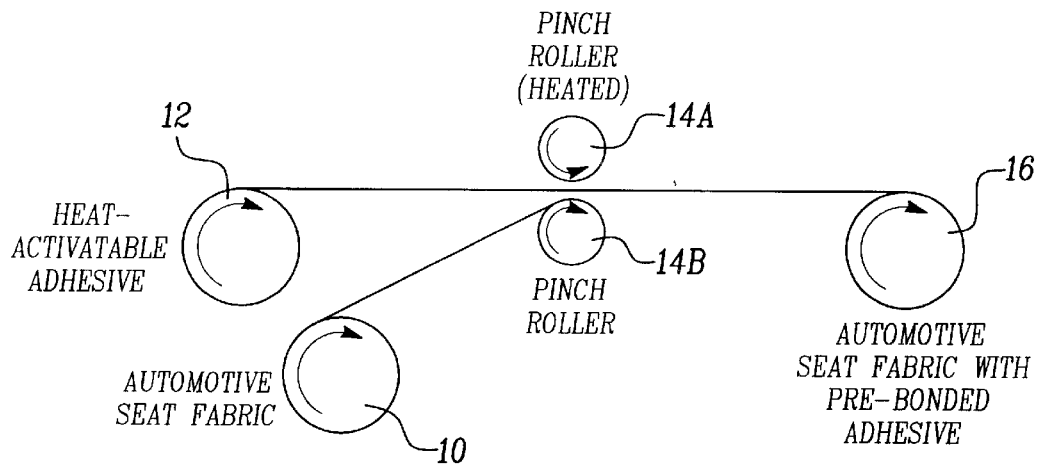
FIG. 1 is a diagram of a conventional continuous lamination machine pre-bonding web form adhesive to the back surface of fabric.

The invention methodology begins with the pre-bonding of adhesive to the fabric material.

Any type of fabric may be used. Fabrics which typically receive a backcoat layer before they are handled, such as wovens and velours, work particularly well in the disclosed methodology. Fabrics sold under the trade names "Pulsar" and "Athens" by Collins & Aikman, 1803N. Main, Roxboro, N.C. 27573 and under the trade names "Joliet" and "Duncan" by Joan Automotive Fabrics, 122 Western Avenue, Lowell, Mass. 01853 have been used successfully. Pulsar is a woven velour, Athens is a circular knit, and Joliet and Duncan are raschel knits. Plush fabrics show significant advantages with the disclosed method over conventional methods because of the reduction in nap crush during processing.

The adhesive should be selected based on its softening temperature, durability and method of application. The automotive industry requires that the final automotive seat assembly pass rigorous tests including resistance to humidity, heat and cold. The adhesive selected must be capable of meeting these standards. Adhesives sold under the trade names "Bostik Web 5220" and "Bostik Powder 5300" by Bostik, Inc., Boston Street, Middleton, Mass. 01949 have been used in the disclosed methodology. These adhesives are polyamide polymers in web and powder form, respectively, with a softening point of approximately 300° F. Because product standards require that the completed automotive seat assembly be able to resist high heat conditions (one manufacturer requires the product to withstand 5 minutes of dry heat at 250° F. without delaminating, for instance), the adhesive must have a softening point above the highest applicable product standard temperature. Use of an adhesive with a softening point of at least 260° F. will likely be required to assure that the final automotive seat assembly is able to pass applicable product standards. The maximum softening temperature of the adhesive is restricted by the heat sensitivity of the fabric. The heat sensitivity of the fabric is affected by the melting temperature of the fibers used to create the fabric, the construction of the fabric (woven, knit, etc.) and the temperature used during certain processes such as heat setting and texturizing during the manufacture of the fabric. Most fabrics exhibit significant degradation when exposed to temperatures above 340° F., even for short periods of time, so this is likely the maximum softening temperature of adhesives for use in this method. The preferred web adhesive has a basis weight of 20 grams per square yard and the powder adhesive is pre-bonded to the fabric at similar or slightly higher application densities. Application densities ranging from 10 to 50 grams per square yard have been used. The minimum application rate is determined experimentally by running tests to determine the minimum amount of adhesive that will consistently result in proper attachment between the trim cover assembly and the cushion pad in a given configuration. While conventional thermoplastic adhesives with a basis weight of 20 grams per square yard are currently preferred, further process improvements will likely reduce the application densities of the adhesive. While there is no theoretical maximum application density for the adhesive, cost considerations and stiffness or boardiness feel in the final automotive seat assembly will likely limit the maximum application rate with conventional thermoplastic adhesives to approximately 50 grams per square yard.

It is also possible to use non-thermoplastic adhesives that have thermoset characteristics after being applied to the back of the fabric in the described method. For instance, a blocked polyurethane adhesive is commonly thought of as a chemical adhesive, although it is activated by heat. This type of adhesive may also be pre-bonded to the back of fabric, configured into a trim cover assembly and activated in a conventional bonding machine to attach a trim cover assembly to a cushion pad.

Several methods for pre-bonding the adhesive to the back of the fabric may be used. It is important that the source of heat required to plasticize the adhesive does not contact the face of the fabric. To reduce nap crush, it is also important that any pressure on the face of the fabric be minimized. To be successfully pre-bonded, the adhesive must be heated to the point that it has been thoroughly "wet out" on the back of the fabric and sufficient adhesive must be intruded into the fabric material to obtain a sufficient bond at the fabric material interface.

In each of these methods, the heat required to effectuate the bond at the fabric material interface is uniformly applied perpendicularly to the direction the fabric moving through the process. It is much easier to assure that a proper bond has been achieved at the fabric material interface in these essentially two-dimensional processes than in the conventional bonding process where heat required to effectuate the bond at the fabric material interface is applied through a three-dimensional tool.

FIG. 1 is a diagram of a conventional continuous lamination machine pre-bonding web form adhesive to the back surface of fabric. Fabric 10 and adhesive 12, in web form, are fed continuously from rolls to pinch rollers 14A and 14B where the back surface of the fabric and the adhesive are forced into contact. The heat required to plasticize the adhesive is applied by heating pinch roller 14A. The fabric with pre-bonded adhesive 16 is then cooled and collected onto a roll. In alternative methods using conventional lamination machines, the pinch rollers may be replaced by a pair of moving belts, the adhesive may be applied in powdered form to the back surface of the fabric prior to contacting the pinch rollers or moving belts, or the heat may be applied immediately prior to contacting the pinch rollers or moving belts or through one of the moving belts.

Figure 2:
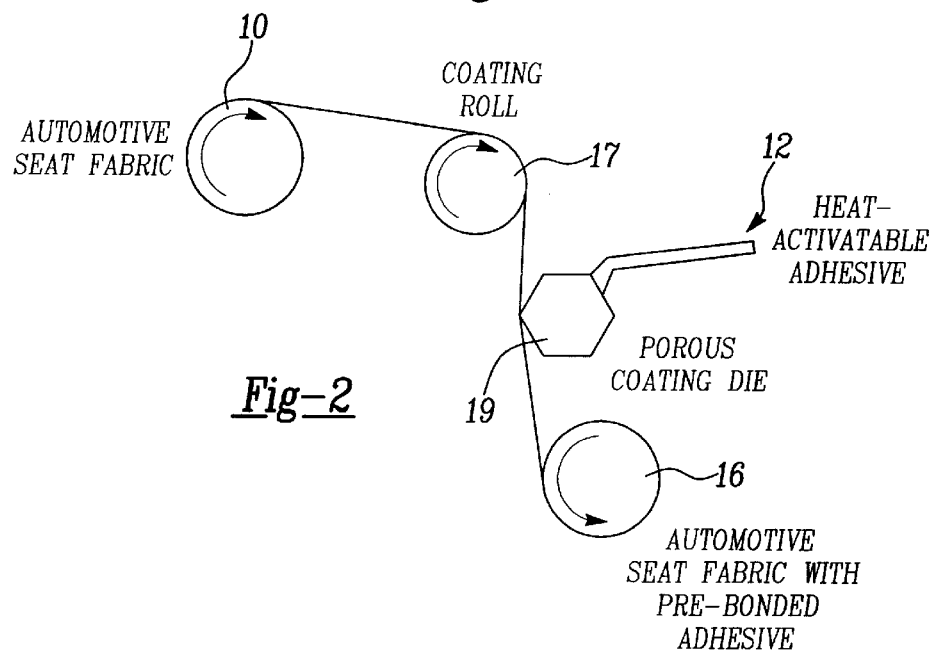
FIG. 2 is a diagram of a porous fabric coating machine pre-bonding bulk form adhesive to the back surface of fabric.

FIG. 2 is a diagram of a porous fabric coating machine of the type manufactured by Nordson Corporation under the trademark Nordson Porous Coat™ pre-bonding bulk form adhesive to the back surface of fabric. Fabric 10 is fed continuously from a roll over a coating roll 17. The fabric then contacts a coating die 19 where the adhesive 12, in bulk form, is applied to the back surface of the fabric. The fabric with pre-bonded adhesive 16 is then cooled and collected onto a roll. The heat required to plasticize the adhesive is applied internally within the coating die. One advantage of this type of machine is that no pressure is applied to the face surface of the fabric during the adhesive application process.

Adhesive may also be pre-bonded to the fabric using rotogravure process machinery. In this process, the adhesive is bonded to the fabric by a heated photogravure cylinder on a rotary press. This method allows for a variety of patterns of pre-bonded adhesive to be applied to the back of the fabric.

Adhesive may also be pre-bonded to the fabric through the use of a conventional roll coating machine. This method applies a continuous film of adhesive to the fabric.

The adhesive may also be applied as a replacement for or as part of a conventional backcoat layer. A conventional backcoat layer, consisting of a latex or acrylic substance with a rubbery texture, is typically applied to fabric to prevent shrinkage and curling after it has been cut. It also helps tie the individual fibers into the fabric, prevents nap pull-through and adds dimensional stability. All woven and velour fabrics currently receive a backcoat layer before they are sewn into trim cover assemblies. Elimination of the conventional backcoat layer is desirable because: (i) the backcoat layer acts as a barrier to the transfer of heat to the adhesive through the trim cover assembly when it is bonded to the cushion pad, (ii) the backcoat layer inhibits the intrusion of adhesive into the fabric material, and (iii) the backcoat layer limits the elongation of the fabric material. One conventional method for increasing the elongation in fabric is to add stretch yarns, at a substantial cost penalty, when the fabric is manufactured. The pre-bonded adhesive performs the functions of a conventional backcoat layer while substantially increasing the ability of the fabric to elongate. In tests comparing Athens fabric with pre-bonded adhesive and no backcoating to conventionally backcoated Athens fabric, the elongation for the fabric with pre-bonded adhesive was substantially better (averaging 23.9% warp/ 5.9% fill) than for the fabric with conventional backcoating (averaging 8.1% warp/3.4% fill). This increased elongation is particularly advantageous for designs which require a great deal of three dimensional relief (such as deep grooves) in the automotive seat assembly.

When using conventional methods, some types of fabrics, such as knits, may not receive a conventional backcoat layer. Application of pre-bonded adhesive to the back surface of these fabrics is advantageous because the pre-bonded adhesive performs the functions of a backcoat layer. Technicians who have sewn trim cover assemblies from unbackcoated knit fabric with pre-bonded adhesive have reported that this fabric was easier to sew than unbackcoated knit fabric without pre-bonded adhesive.

An adhesive compound which includes conventional latex or acrylic substances and/or additives such as flame-retardants, may be required for certain fabrics because of the stringent product requirements placed on automotive seat assemblies.

This fabric with pre-bonded adhesive is then cut into pieces. Any other pieces required to complete the trim cover assembly are cut from the same or different fabric. When trim cover assemblies are bonded to cushion pads, normally only the surface which will be in contact with the seat occupant, referred to as the "A" surface, is bonded to the cushion pad. Thus only the fabric pieces for these surfaces require the use of the fabric with pre-bonded adhesive. Depending on how the automotive trim cover assembly has been designed, however, the other fabric pieces may or may not consist of the same fabric used for the contact surfaces. If the same fabric is used for the occupant contact pieces and non-contact pieces, it may be preferable from an operational viewpoint to use the fabric with pre-bonded adhesive for non-contact pieces even when these pieces will not ultimately be bonded to the cushion pad.

Because the adhesive has been pre-bonded to the fabric before the trim cover assembly was manufactured, it is nearly impossible to improperly position or unintentionally omit the adhesive during the bonding process. In addition, because the adhesive has been pre-bonded to the fabric in roll form, it is much easier to assure that the adhesive is being applied smoothly and continuously. This assures that there will not be visible imperfections, such as wrinkles, in the finished seat.

Figure 3:
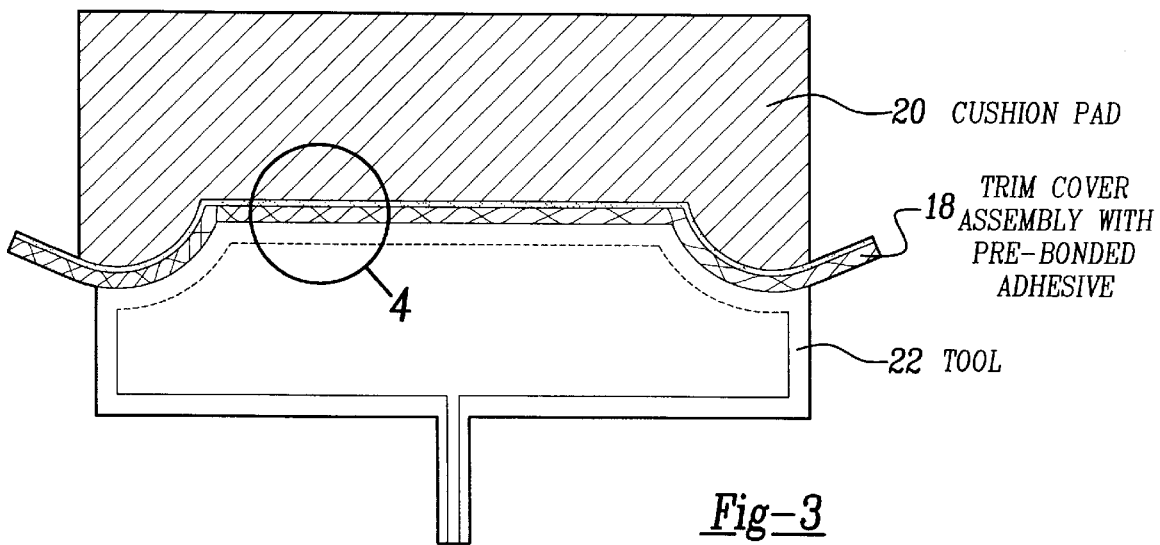
FIG. 3 is a cross-sectional diagram of a trim cover assembly with pre-bonded adhesive in accordance with an embodiment of this invention in a bonding machine prior to the bonding process.

FIGS. 3–6 illustrate the bonding phase of the invention methodology. FIG. 3 represents a cross-sectional view of the bonding phase immediately prior to the bonding process. A trim cover assembly with pre-bonded adhesive 18 has been placed in a bonding machine between a cushion pad 20 and a tool 22. FIG. 4 represents an enlarged view of the bonding phase immediately prior to the bonding process, taken within circle 4 of FIG. 3. The adhesive component of the trim cover assembly 18B has been pre-bonded to the fabric material component of the trim cover assembly 18A prior to the bonding phase and has sufficiently intruded into the fabric material 18A to obtain a suitable bond at the fabric material interface. FIG. 5 represents a cross-sectional view of the bonding phase of the invention methodology during the bonding process. Heated vapor 24, such as steam, applied through tool 22, passes through the trim cover assembly with pre-bonded adhesive 18 and penetrates into the cushion pad 20. FIG. 6 represents an enlarged view of the bonding phase of the invention methodology during the bonding process, taken within circle 6 of FIG. 5. Heated vapor 24, applied through tool 22, and passing through the trim cover assembly 18, causes sufficient adhesive 18B to intrude into the cushion pad 20 to obtain a sufficient bond at the cushion material interface. Any migration of the adhesive 18B toward the base fabric material 18A is merely incidental and not required to obtain a suitable bond at the fabric material interface.

Figure 7A:
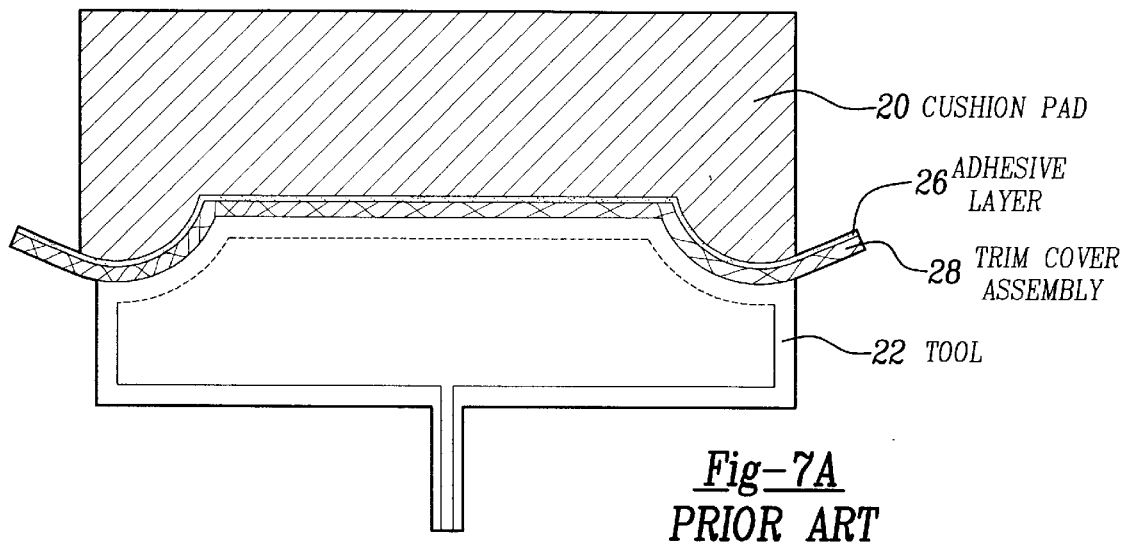
FIGS. 7A, 7B, and 7C illustrate the bonding process in a prior art methodology.
Figure 7B:
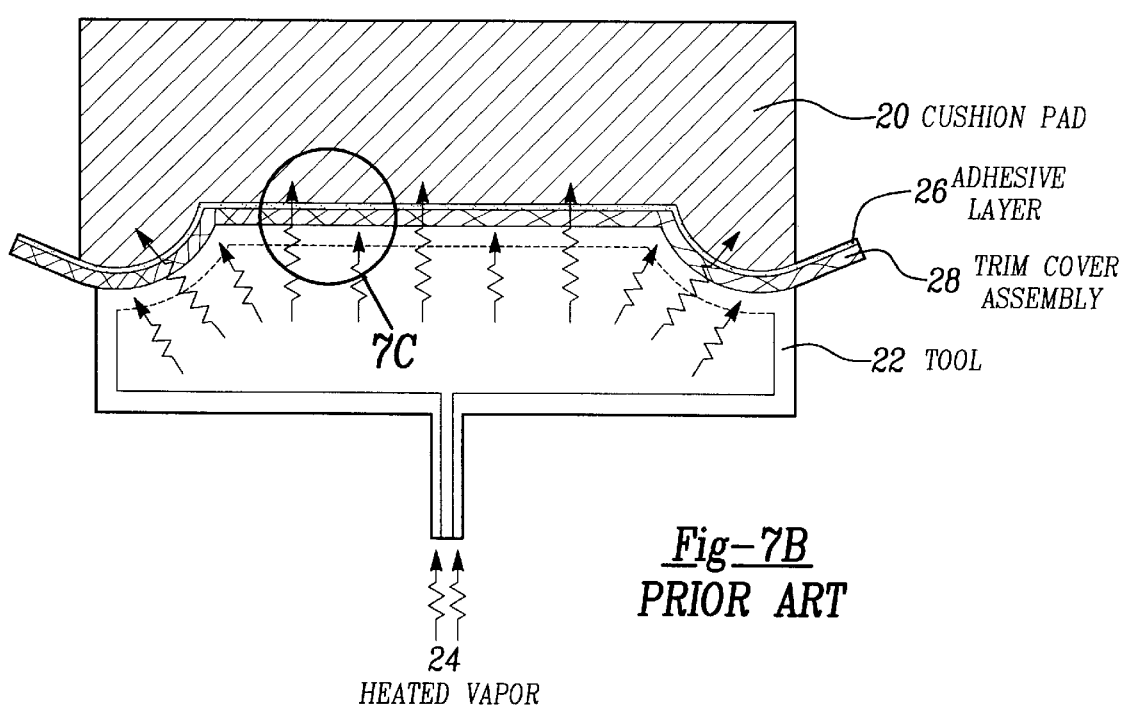
Figure 7C:
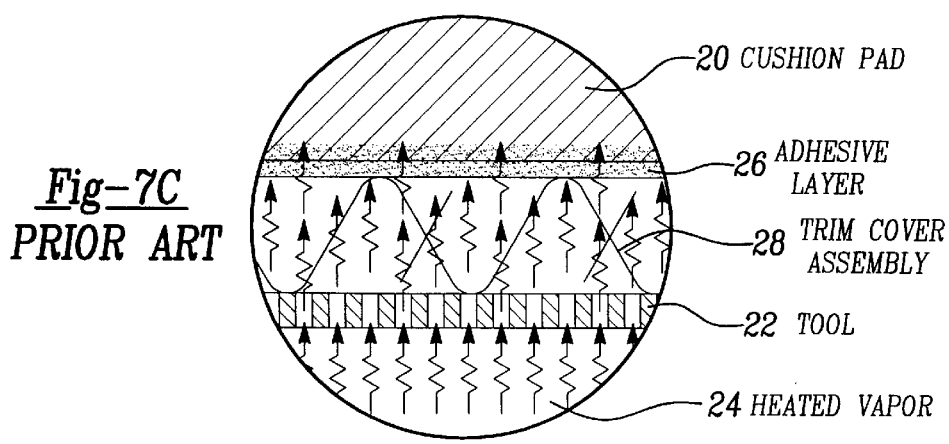

FIGS. 7A, 7B, and 7C illustrate a cross-sectional view of the conventional bonding process. Referring to FIG. 7A, a trim cover assembly 28 and an adhesive layer 26 are place between a cushion pad 20 and a tool 22. Referring to FIG. 7B, heated vapor 24, applied through tool 22, passes through the trim cover assembly 28, the adhesive layer 26, and into cushion pad 20. Referring to FIG. 7C, if shorter bonding cycles times are used in the conventional bonding process, insufficient adhesive 26 will intrude into the trim cover assembly 28 to obtain a suitable bond at the fabric material interface.

Figure 8A:
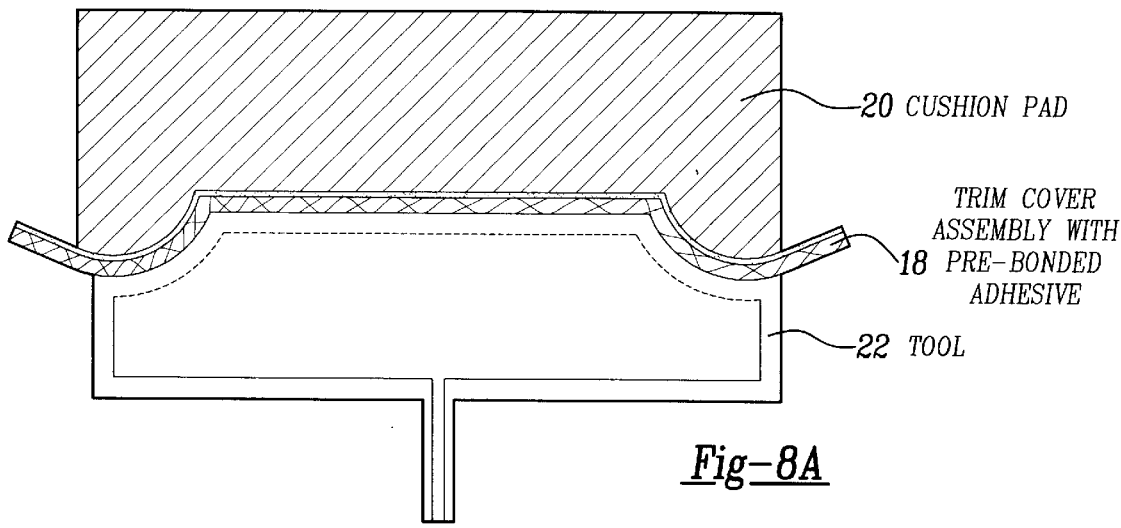
FIGS. 8A, 8B, and 8C illustrate the bonding process in the invention methodology.
Figure 8B:
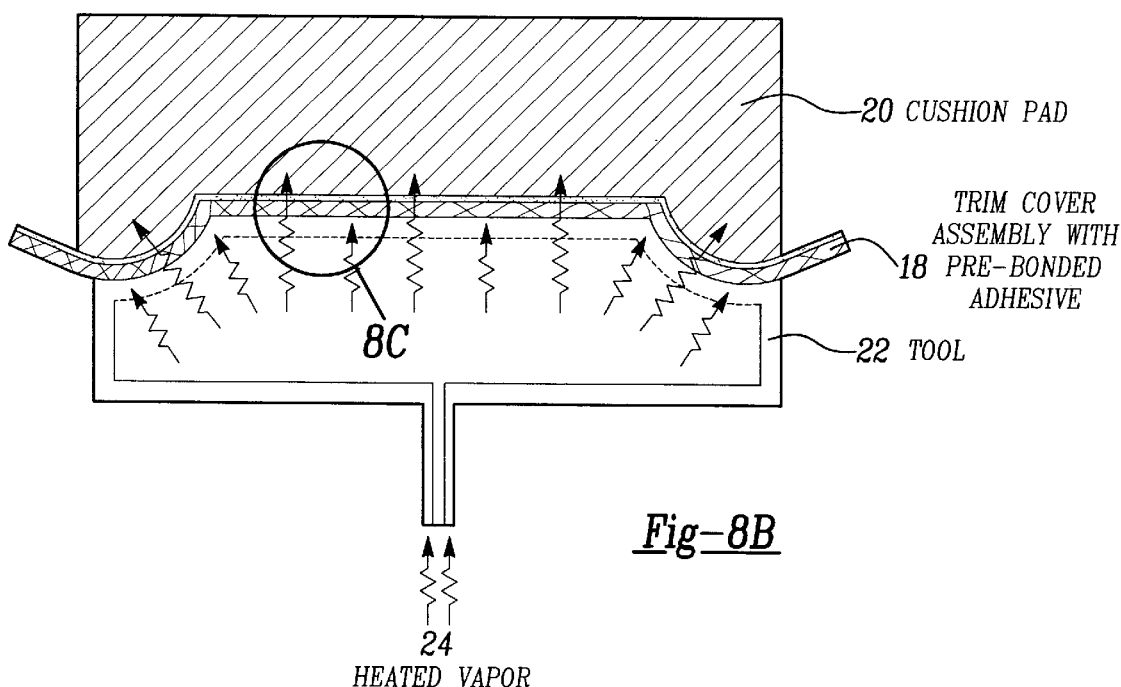
Figure 8C:
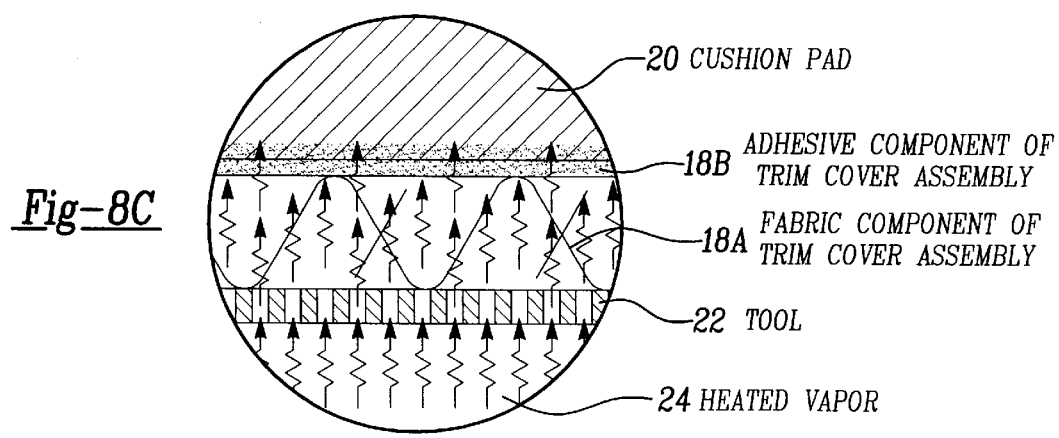

FIGS. 8A, 8B, and 8C illustrate a cross-sectional view of the improved bonding process in accordance with the subject invention. Referring to FIG. 8A, a trim cover assembly with pre-bonded adhesive 18 is place between a cushion pad 20 and a tool 22. Referring to FIG. 8B, heated vapor 24, applied through tool 22, passes through the trim cover assembly with pre-bonded adhesive 18, and into cushion pad 20. Because a suitable bond at the fabric material interface has already been achieved through the use of the fabric with pre-bonded adhesive, shorter bonding cycle times may be used. A properly bonded assembly is shown in FIG. 8C.

Because a proper bond has already been achieved at the fabric material interface prior to the bonding phase in the disclosed methodology, it is possible to reduce the bonding cycle times over conventional methods. The bonding cycle time required to obtain a suitable bond is estimated to be reduced an average 20% to 30% when using trim cover assemblies assembled from backcoated fabrics with pre-bonded adhesives as compared to bonding separate trim cover assemblies assembled from backcoated fabrics and adhesive layers to cushion pads. Application of heated vapor for between four to twelve seconds have proven successful with the disclosed methodology.

The disclosed methodology may also be used, without significant modification, to manufacture automotive seat headrests and armrests.

Modifications to this method and alternative methods which do not depart from the spirit and scope of the invention will now be apparent to those skilled in the art. Accordingly, it is to be understood that the invention can be practiced within the scope of the appended claims other than as specifically described above.

What is claimed is:

1. A method for manufacturing automotive seat assemblies including a cushion pad and a trim cover assembly made from fabric with a front surface and a back surface, the method comprising the steps of:

pre-bonding heat-activatable adhesive to said back surface of said fabric to produce fabric with pre-bonded adhesive;

cutting said fabric with pre-bonded adhesive to produce a first piece of fabric with pre-bonded adhesive;

joining said first piece of fabric with pre-bonded adhesive to a second piece of fabric which is free of adhesive to form said trim cover assembly;

placing said back surface of said first piece of fabric with pre-bonded adhesive forming said trim cover assembly adjacent to said cushion pad; and applying heat to activate said adhesive and intrude a portion of said adhesive into said cushion pad, thereby attaching said first piece of fabric and thus said trim cover assembly to said cushion pad.

2. A method as recited in claim 1, wherein said step of pre-bonding heat-activatable adhesive is performed on one of a continuous lamination machine, porous coating machine, rotogravure process machine, and roll coating machine.

3. A method as recited in claim 1, wherein said adhesive is pre-bonded to said fabric as a continuous film.

4. A method as recited in claim 1, wherein said adhesive is pre-bonded to said fabric as a pattern.

5. A method as recited in claim 1, wherein said adhesive is pre-bonded to said fabric as part of a backcoat layer.

6. A method as recited in claim 1, wherein said back surface of said fabric is free of a backcoat layer prior to said step of pre-bonding heat-activatable adhesive to said back surface of said fabric.

7. A method as recited in claim 1, wherein said step of joining said first piece of fabric with pre-bonded adhesive to said second piece of fabric comprises sewing said first piece of fabric with pre-bonded adhesive to said second piece of fabric.

8. A method as recited in claim 1, wherein said second piece of fabric comprises a different fabric than said first piece of fabric with pre-bonded adhesive.

9. A method as recited in claim 1, wherein said applying heat step comprises passing saturated steam through said first piece of fabric into said cushion pad.

10. A method as recited in claim 1, wherein said applying heat step comprises passing superheated stream through said first piece of fabric into said cushion pad.

* * * * *